L. F. TABBERT.
COUPLING.
APPLICATION FILED JUNE 25, 1915.

1,162,527.

Patented Nov. 30, 1915.

WITNESSES

INVENTOR
Louis F. Tabbert
BY Munn & Co.
ATTORNEYS

UNITED STATES PATENT OFFICE.

LOUIS FRANK TABBERT, OF TAMPA, FLORIDA.

COUPLING.

1,162,527.　　　　Specification of Letters Patent.　　Patented Nov. 30, 1915.

Application filed June 25, 1915. Serial No. 36,212.

*To all whom it may concern:*

Be it known that I, LOUIS F. TABBERT, a citizen of the United States, and a resident of Tampa, in the county of Hillsboro and State of Florida, have invented an Improvement in Couplings, of which the following is a specification.

This invention relates to flexible or universal joints for pipe coupling and more particularly to a joint of the ball and socket type.

One of the objects of the present invention is to dispense with the employment of rings and the like for retaining the socket member in engagement with the ball member, said rings oftentimes becoming loose and rendering the joint defective. This object is accomplished by the provision of a detachable section for the socket member having a pivotal connection with the same and adapted to effectively coöperate with the main portion of said member to retain the ball member in engagement therewith.

A further object of the invention is the provision of a coupling of this nature which is simple in construction, thus reducing the cost of manufacture thereof to a minimum and which is effective in carrying out the purpose for which it is designed.

The inventive idea involved is capable of receiving a variety of mechanical expressions, one of which, for the purpose of illustrating the invention, is shown in the accompanying drawing, in which—

Figure 1:
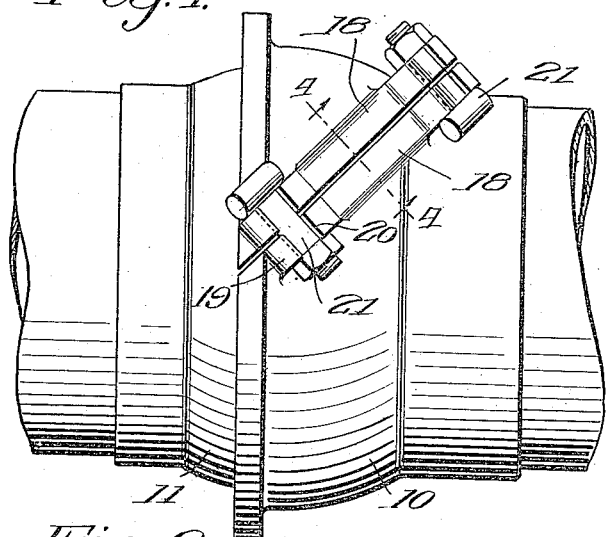
Figure 4:
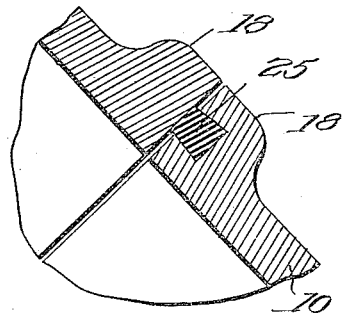
Figure 2:
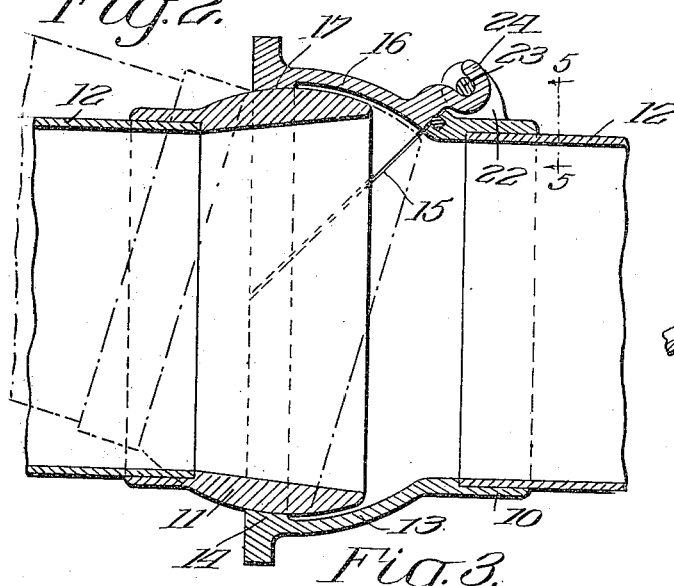
Figure 5:
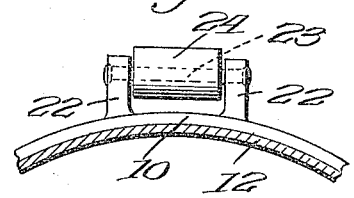
Figure 3:
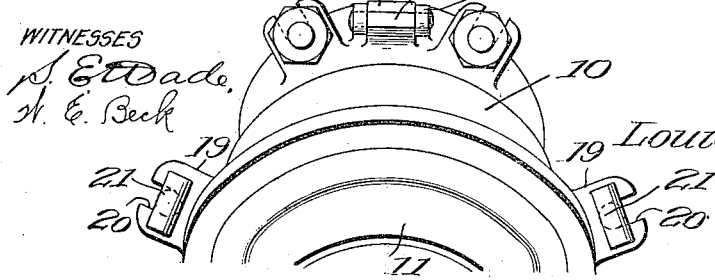

Figure 1 is a side elevation of the coupling constructed in accordance with the invention. Fig. 2 is a vertical longitudinal view thereof. Fig. 3 is a perspective view. Fig. 4 is a section on the line 4—4 of Fig. 1, and Fig. 5 is a section on the line 5—5 of Fig. 2.

Referring more particularly to the accompanying drawing, in which like reference characters indicate similar parts, the numeral 10 indicates generally the socket member and 11 the ball member of the coupling. These members are so constructed as to receive suitable pipes 12 in the outer ends thereof. The ball member 11 is of ordinary construction with the inner end thereof formed from a section of a sphere.

The socket member is also formed from a portion of a sphere and comprises a main portion 13 having a flanged portion 14 adapted for engagement with the outer face of the ball member as shown in Fig. 2. The main section 13 is reduced or cut away as indicated at 15 on a diagonal plane through the center of the spherical portion of the member. The socket member 10 is completed by an auxiliary section 16 which, in transverse section, forms substantially a segment of a circle and is adapted to coöperate with the main section 13 in forming the remainder of the spherical portion of said socket member. The outer edge of said auxiliary section is flanged as indicated at 17 to engage the outer face of the ball member 11 similarly to the flange portion 14. The main and auxiliary sections 13 and 16 are provided upon their adjacent edges with opposed flanges 18 having ears 19 formed thereon and provided with notches 20 for the reception of suitable fastening bolts 21 for securing said sections together. Mounted between two of the ears 19 are a pair of oppositely disposed lugs 22 having mounted therein a pintle 23 which is adapted to receive a hooked extension 24 formed upon the auxiliary section 16 whereby said section is pivoted to the main section. The diagonal face of the main section 13 adjacent the auxiliary section 16 is provided with an insert of packing 25 which extends slightly beyond said edge and is engaged by the adjacent edge of the auxiliary section whereby a tight joint is formed therebetween.

It will be apparent from the foregoing description that in order to release the ball member from engagement with the socket member, it will first be necessary to detach the bolts 21 whereupon the auxiliary section may be swung about its pivot 23 and the ball member 11 readily removed. A reverse operation is used to connect two members of the coupling and it will be seen that said members are effectively retained in engagement with each other by the construction shown and described.

I claim:—

A coupling comprising a ball member, a socket member therefor consisting of a main spherical section cut away on a plane extending diagonally therethrough, a pivot carried by said main section, an auxiliary section forming a continuation of said main section and having an extension connected to said pivot, opposed flanges formed on the adjacent edges of said main and auxiliary sections, said flanges being provided with ears having notches therein, fastening bolts engaging said notches for securing said sections together, and a packing carried by said main section and engaging said auxiliary section.

LOUIS FRANK TABBERT.

Witnesses:
EDWIN S. JOHNSON,
HENRY A. McCANN.